(12) United States Patent
Kim (10) Patent No.: US 6,947,262 B2
(45) Date of Patent: Sep. 20, 2005

(54) MAGNETIC READING HEAD (75) Inventor: Yong-su Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 224 days.

(21) Appl. No.: 10/358,159

(22) Filed: Feb. 5, 2003

(65) Prior Publication Data
US 2003/0214759 A1 Nov. 20, 2003

(30) Foreign Application Priority Data

May 15, 2002 (KR) ........................................ 2002-26891

(51) Int. Cl.[7] .............................................. G11B 5/127
(52) U.S. Cl. ...................................................... 360/319
(58) Field of Search ................................ 360/319, 317, 360/126; 324/252

(56) References Cited

U.S. PATENT DOCUMENTS

| 3,975,772 | A | * | 8/1976 | Lin ............................ 360/317 |
| 5,311,387 | A | * | 5/1994 | Mallary ....................... 360/126 |
| 5,784,224 | A | * | 7/1998 | Rottmayer et al. ......... 360/324 |
| 6,430,009 | B1 | * | 8/2002 | Komaki et al. ............. 360/319 |
| 6,671,117 | B2 | * | 12/2003 | Dimitrov et al. ............. 360/57 |
| 6,765,767 | B2 | * | 7/2004 | Trindade et al. ............ 360/319 |
| 6,807,031 | B2 | * | 10/2004 | Macken et al. ............. 360/317 |

FOREIGN PATENT DOCUMENTS

EP          000669607 A2 *   8/1995

* cited by examiner

Primary Examiner—Allen Cao
(74) Attorney, Agent, or Firm—Buchanan Ingersoll PC; Burns, Doane, Swecker & Mathis, LLP

(57) ABSTRACT

A magnetic reading head is provided. The magnetic reading head reads information recorded on a recording medium having a soft underlayer and a magnetic layer stacked on the soft underlayer, and includes a magneto-resistive element and a pair of shield layers. The magneto-resistive element is positioned over the magnetic layer, keeping a predetermined distance G from the soft underlayer. The pair of shield layers are arranged parallel to the magneto-resistive element, keeping predetermined distances from both sides of the magneto-resistive element. Here, the shield layers have widths less than double of the predetermined distance G. In this structure, by properly adjusting the widths of the shield layers, magnetic fields formed by the magnetization of the recording medium under the shield layers do not affect the magnetoresistive element. As a result, sensitivity of the magnetic reading head can be improved.

9 Claims, 7 Drawing Sheets

MAGNETIC READING HEAD

This application claims the priority of Korean Patent Application No. 2002-26891 filed on May 15, 2002 in the Korean Intellectual Property Office, the disclosure of which is incorporated herein in its entirety by reference.

BACKGROUND OF THE INVENTION

1. Field of the Invention

The present invention relates to a magnetic reading head using a magneto-resistive element, and more particularly, to a magnetic reading head which has an improved sensitivity by adjusting the widths of its shield layers.

2. Description of the Related Art

Figure 1A:
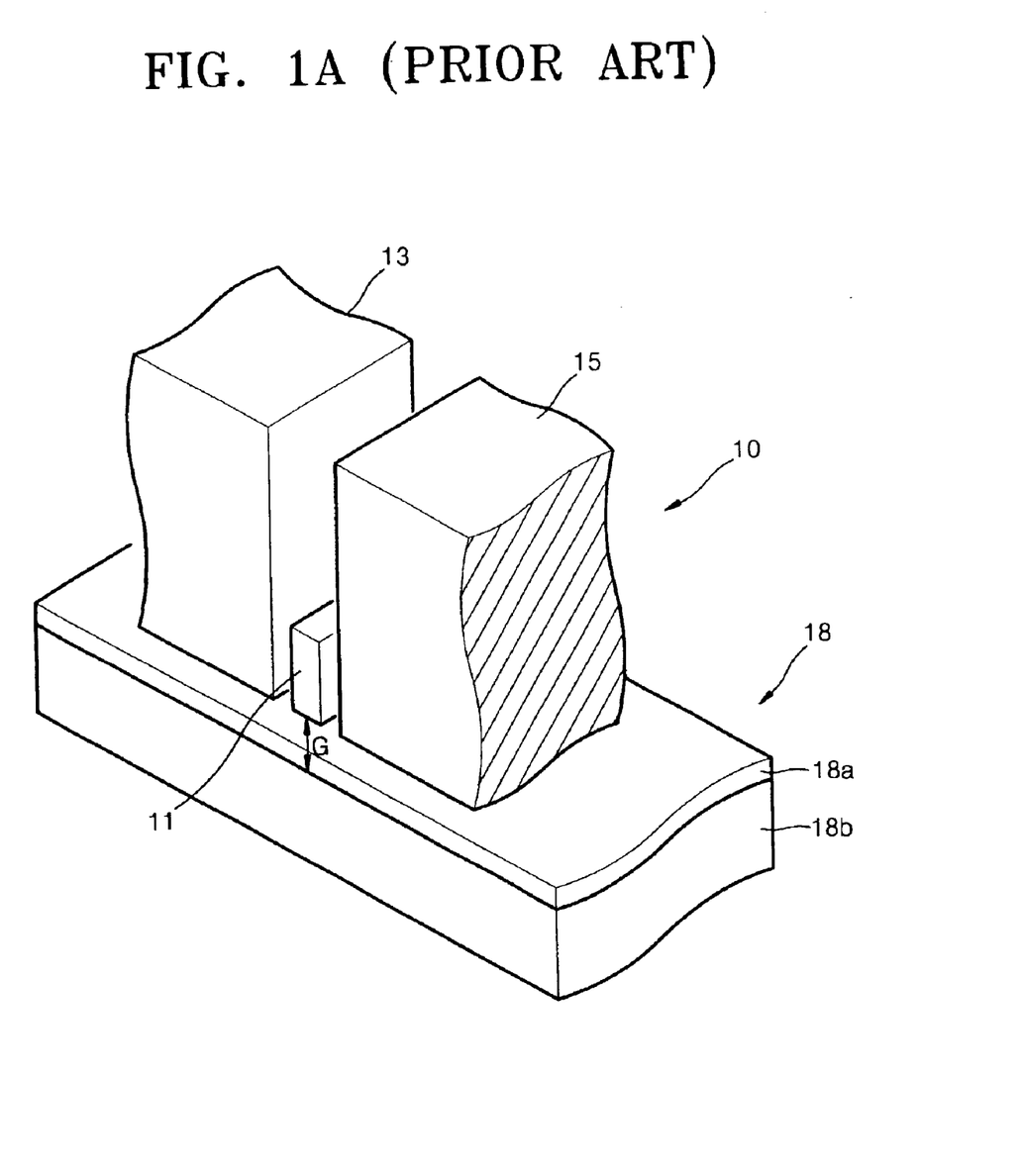
FIG. 1A is a perspective view of a conventional magnetic reading head.
Figure 1B:
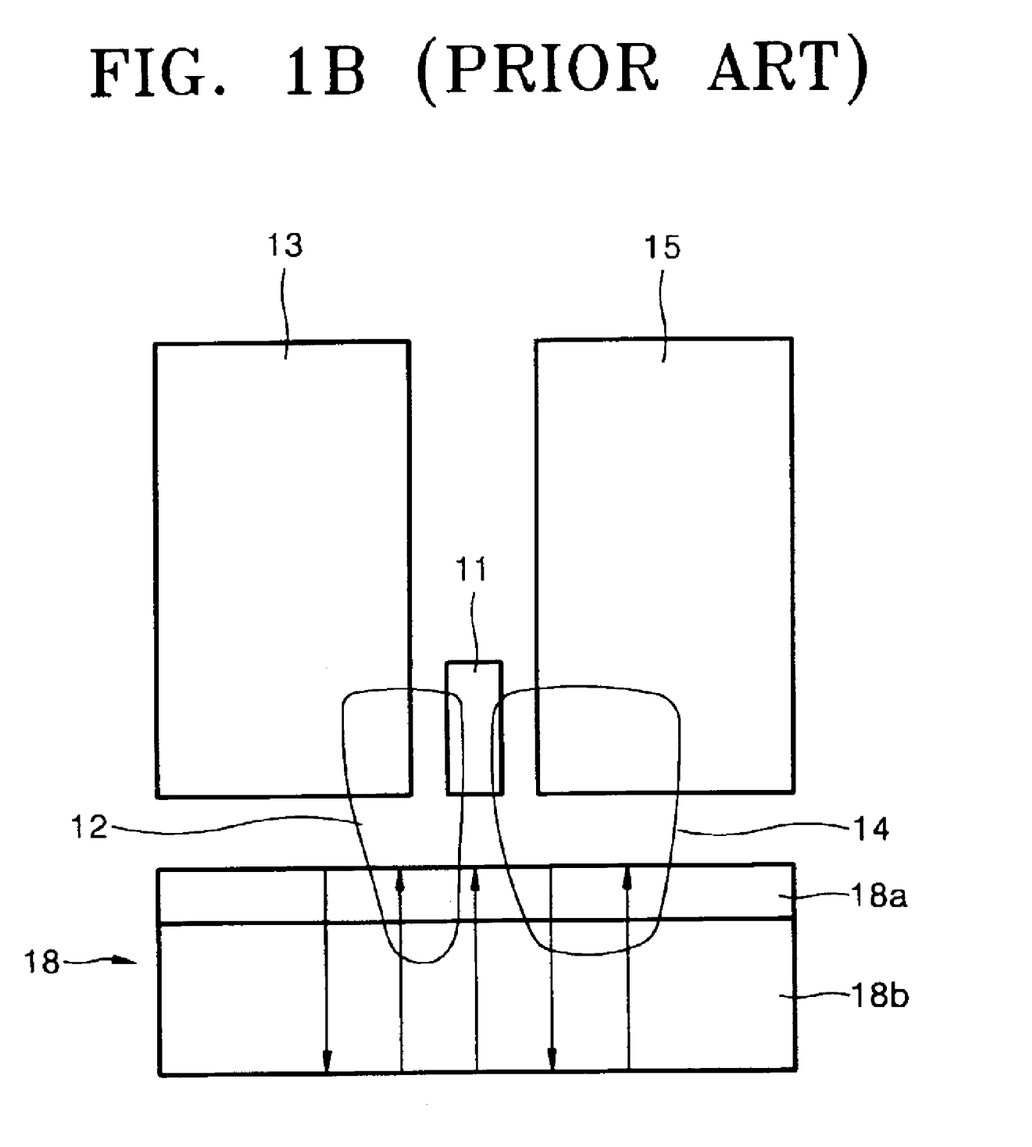
FIG. 1B is a schematic conceptional view illustrating the distribution of magnetic fields in the conventional magnetic reading head.

FIG. 1A is a schematic perspective view of a conventional magnetic reading head, and FIG. 1B is schematic conceptional view illustrating the distribution of magnetic fields in the conventional magnetic reading head.

Referring to FIG. 1A, the conventional magnetic reading head includes a magneto-resistive (MR) element 11 which is used as a sensor and shield layers 13 and 15 which enclose the MR element 11. The conventional magnetic reading head is greatly affected by a magnetic field because a width of each of the shield layers 13 and 15 is wider than a distance G between the MR element 11 and a soft underlayer 18b of a recording medium 18.

The MR element 11 used in the magnetic reading head is a sensor which uses a principle of changes in a resistance of the MR element 11 due to a relative angle difference between a magnetized direction of a free layer of the MR element 11 and a magnetized direction of a pinned layer of the MR element 11. Since the magnetized direction of the free layer of the MR element 11 varies according to a magnetized direction of the recording medium 18, the magnetic reading head can read information from the recording medium 18 by detecting the changes in resistance of the MR element 11.

The shield layers 13 and 15 serve to shield outer magnetic fields except magnetic fields formed by the magnetization of the recording medium 18 to be detected under the MR element 11 and mechanically protect the MR element 11.

However, as shown in FIG. 1B, magnetic paths are formed by the magnetization of magnetic domains opposite to lower portions of the shield layers 13 and 15 as well as by the magnetization of the recording medium 18 adjacent to the MR element 11. Thus, noise increases in proportion to areas of bottom surfaces of the lower portions of the shield layers 13 and 15, which results in the deterioration of sensitivity of the magnetic reading head when reading information.

SUMMARY OF THE INVENTION

To solve the above-other problems, it is an object of the present invention to provide a magnetic reading head which has an improved sensitivity by reducing noise when reading information.

Accordingly, to achieve the above object, there is provided a magnetic reading head which reads information recorded on a recording medium having a soft underlayer and a magnetic layer stacked on the soft underlayer. The magnetic reading head includes a magneto-resistive element and a pair of shield layers. The magneto-resistive element is positioned over the magnetic layer, keeping a predetermined distance G from the soft underlayer. The pair of shield layers are arranged parallel to the magneto-resistive element, keeping predetermined distances from both sides of the magneto-resistive element. Here, the shield layers have widths less than double of the predetermined distance G.

To achieve the above object, there is provided a magnetic reading head which reads information recorded on a recording medium having a soft underlayer and a magnetic layer stacked on the soft underlayer. The magnetic reading head includes a magneto-resistive element, a pair of first shield layers, and a pair of second shield layers. The magneto-resistive element is positioned over the magnetic layer, keeping a predetermined distance G from the soft underlayer. The pair of first shield layers are arranged parallel to the magnetoresitive element, keeping predetermined distances from both sides of the magnetoresistive element. The pair of second shield layers are arranged parallel to the pair of first shield layers 25, keeping predetermined distances from the first shield layers 25. Here, the first shield layers have widths less than double of the predetermined distance G.

To achieve the above object, there is provided a magnetic reading head which reads information recorded on a recording medium having a soft underlayer and a magnetic layer stacked on the soft underlayer. The magnetic reading head includes a magneto-resistive element and a pair of shield layers. The magneto-resistive element is positioned over the magnetic layer, keeping a predetermined distance G from the soft underlayer. The pair of shield layers are arranged parallel to the magnetoresitive element, keeping predetermined distances from both sides of the magnetoresistive element. Here, the shield layers have upper and lower portions, bottom surfaces of the lower portions of the shield layers face the recording medium, the upper portions of the shield layers are wider than the lower portions of the shield layers, and the bottom surfaces of the lower portions have widths less than double of the predetermined distance G.

The bottom surfaces of the lower portions of the shield layers facing the recording medium have widths of 0.1 $\mu$m or less.

In the above-described magnetic reading head, it is preferable that information is recorded on the magnetic layer using a perpendicular magnetic recording method.

In a magnetic reading head of the present invention, bottom surfaces of lower portions of shield layers adjacent to a recording medium have less than predetermined widths so that magnetic fields formed by the magnetization of magnetic domains under the shield layers do not affect a magnetoresistive element. As a result, sensitivity of the magnetic reading medium can be improved with a reduction in noise during reading.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Hereinafter, a magnetic reading head according to embodiments of the present invention will be now described in detail with reference to the attached drawings. In the drawings, a width of a magneto-resistive element and widths of shield layers are exaggerated for clarity.

Figure 2A:
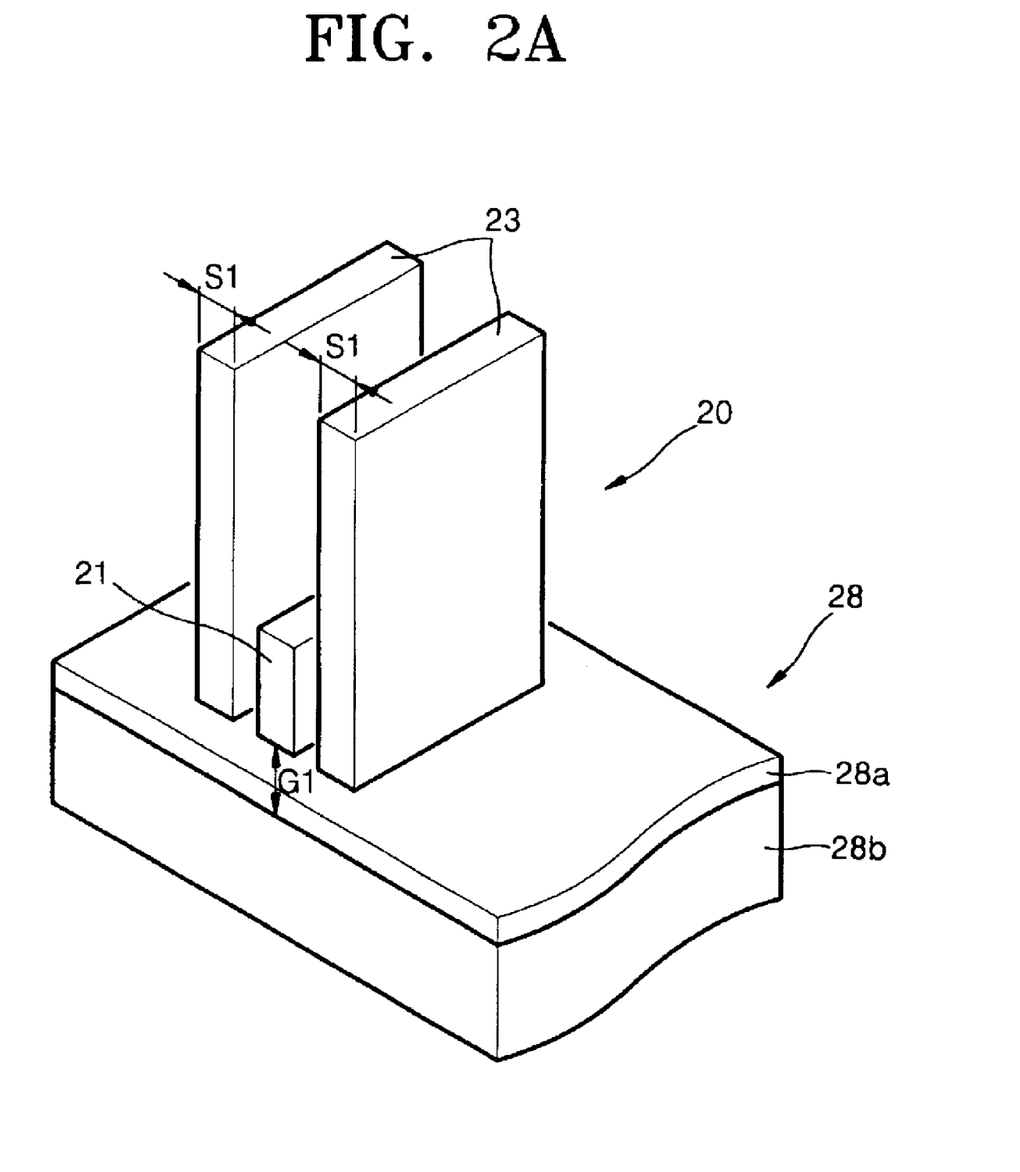
FIG. 2A is a perspective view of a magnetic reading head according to a first embodiment of the present invention.

FIG. 2A is a perspective view of a magnetic reading head according to a first embodiment of the present invention. Referring to FIG. 2A, the magnetic reading head 20 includes a magneto-resistive (MR) element 21 which is positioned over a magnetic layer 28a of a recording medium 28 and a pair of shield layers 23 which are disposed beside both sides of the MR element 21, keeping predetermined distances form the MR element 21. Information is recorded on the magnetic layer 28a using a perpendicular magnetic recording method in which magnetic vectors of magnetic domains are vertically formed.

The MR element 21 keeps a predetermined distance G1 from a soft underlayer 28b underneath the magnetic layer 28a of the recording medium 28.

The shield layers 23 are formed to have widths S1 less than double the predetermined distance G1, preferably widths of less than 0.1 $\mu$m.

In the prior art, the magnetic fields, which are formed by the magnetization of the magnetic layer 28a and correspond to the areas of the bottom surfaces of the shield layers 13 and 15, nearly reach the MR element 11. As a result, noise of the MR element 21 increases, which deteriorates the performance of the conventional magnetic reading head. However, in the magnetic reading head according to the first embodiment of the present invention, the widths S1 of the shield layers 23 are reduced so that magnetic fields formed by the magnetization of magnetic domains positioned beyond and under the range of the shield layers 23 do not affect the MR element 21.

Figure 2B:
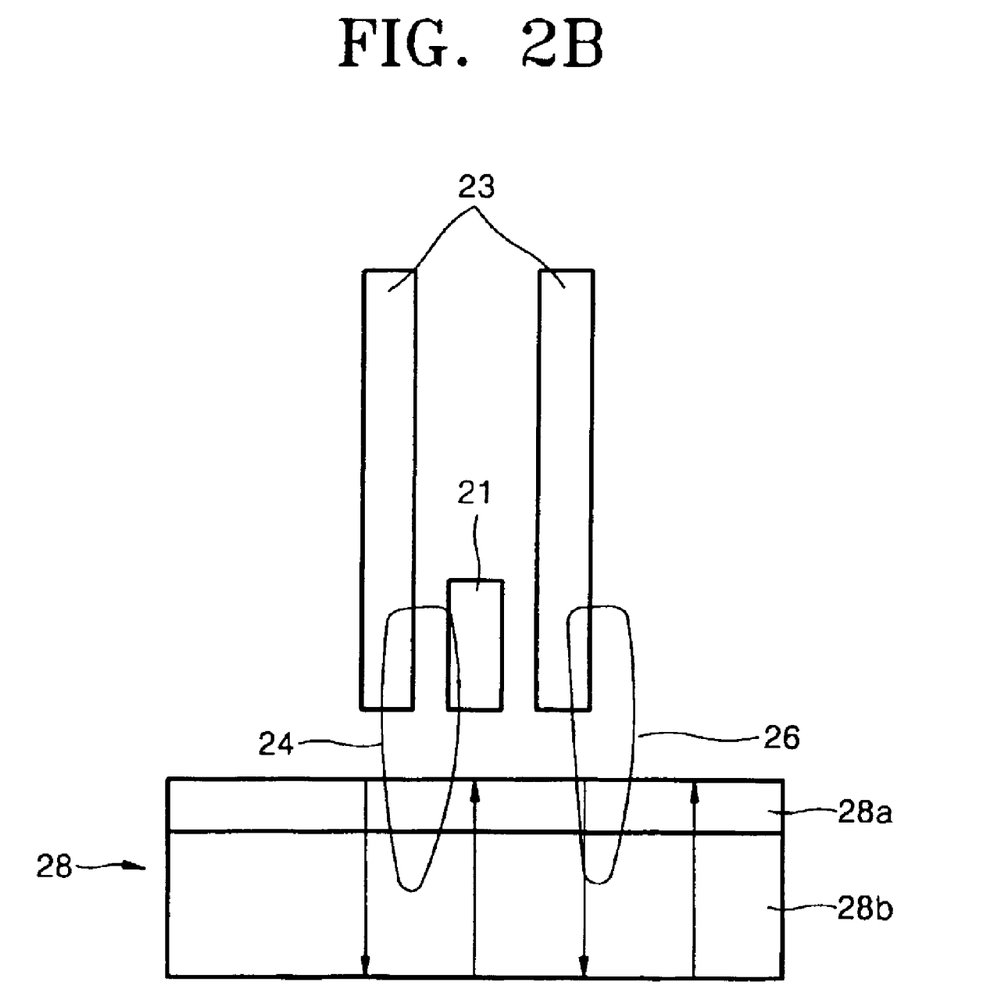
FIG. 2B is a schematic conceptional view illustrating the distribution of magnetic fields in the magnetic reading head according to the first embodiment of the present invention.

FIG. 2B is a schematic conceptional view illustrating the distribution of magnetic fields of the magnetic reading head according to the first embodiment of the present invention. Referring to FIG. 2B, a magnetic field line formed by the magnetization of the recording medium 28 under the MR element 21 constitutes a magnetic circuit 24 which passes a gap between the recording medium 28 and the MR element 21, changes a magnetized direction of a free layer of the MR element 21, passes a gap between the MR element 21 and one of the shield layers 23, passes through the one of the shield layers 23, and returns to a soft underlayer 28b of the recording medium 28.

A magnetic field line formed by the magnetization of magnetic domains of the recording medium 28 positioned beyond the range of the other one of the shield layers 23 constitutes a magnetic circuit 26 which passes a gap between the recording medium 28 and the other one of the shield layers 23, passes through the other one of the shield layers 23, and returns to the recording medium 28. Therefore, the magnetic field lines do not affect the MR element 21.

This effect is identical to effects achieved by magnetic reading heads according to second and third embodiments of the present invention.

Figure 3:
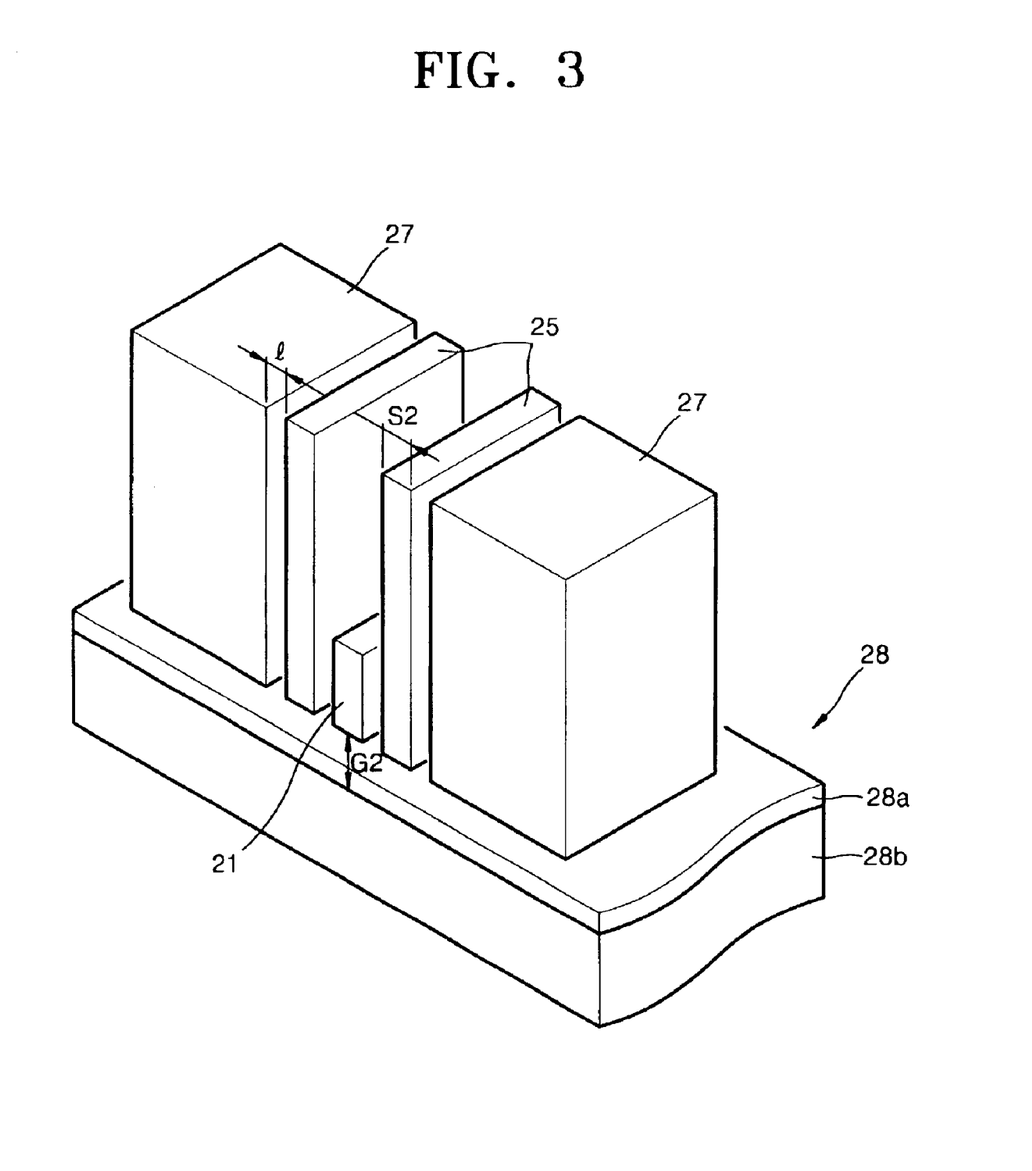
FIG. 3 is a perspective view of a magnetic reading head according to a second embodiment of the present invention.

FIG. 3 is a perspective view of a magnetic reading head according to a second embodiment of the present invention. Referring to FIG. 3, the magnetic reading head according to the second embodiment has the same elements as elements of the magnetic reading head according to the first embodiment. However, the magnetic reading heads according to the second embodiment further includes a pair of second shield layers 27 which are arranged parallel to a pair of first shield layers 25, at predetermined distances I from the first shield layers 25.

In the magnetic reading head according to the second embodiment, if widths S2 of the first shield layers 25 are too small, the magnetic reading head magnetically interferes with a recording head parallel to the magnetic reading head or is sensitive to radio frequency (RF) noise, thereby making undesired noise. Thus, the second shield layers 27 are further arranged so as to guide magnetic field lines toward the second shield layers 27 not toward the first shield layers 25, thereby preventing interferences with outer magnetic fields.

Here, distances I between the first shield layers 25 and the second shield layers 27 are similar to widths S2 of the first shield layers 25. Also, the thicker the second shield layers 27, the better, but for manufacturing reasons it is better that each of the second shield layers 27 has a thickness of about 2 $\mu$m.

As in the magnetic reading head according to the first embodiment, the first shield layers 25 have the widths S2 less than double a predetermined distance G2 between a MR element 21 and a soft underlayer 28b, preferably widths of 0.1 $\mu$m.

Figure 4:
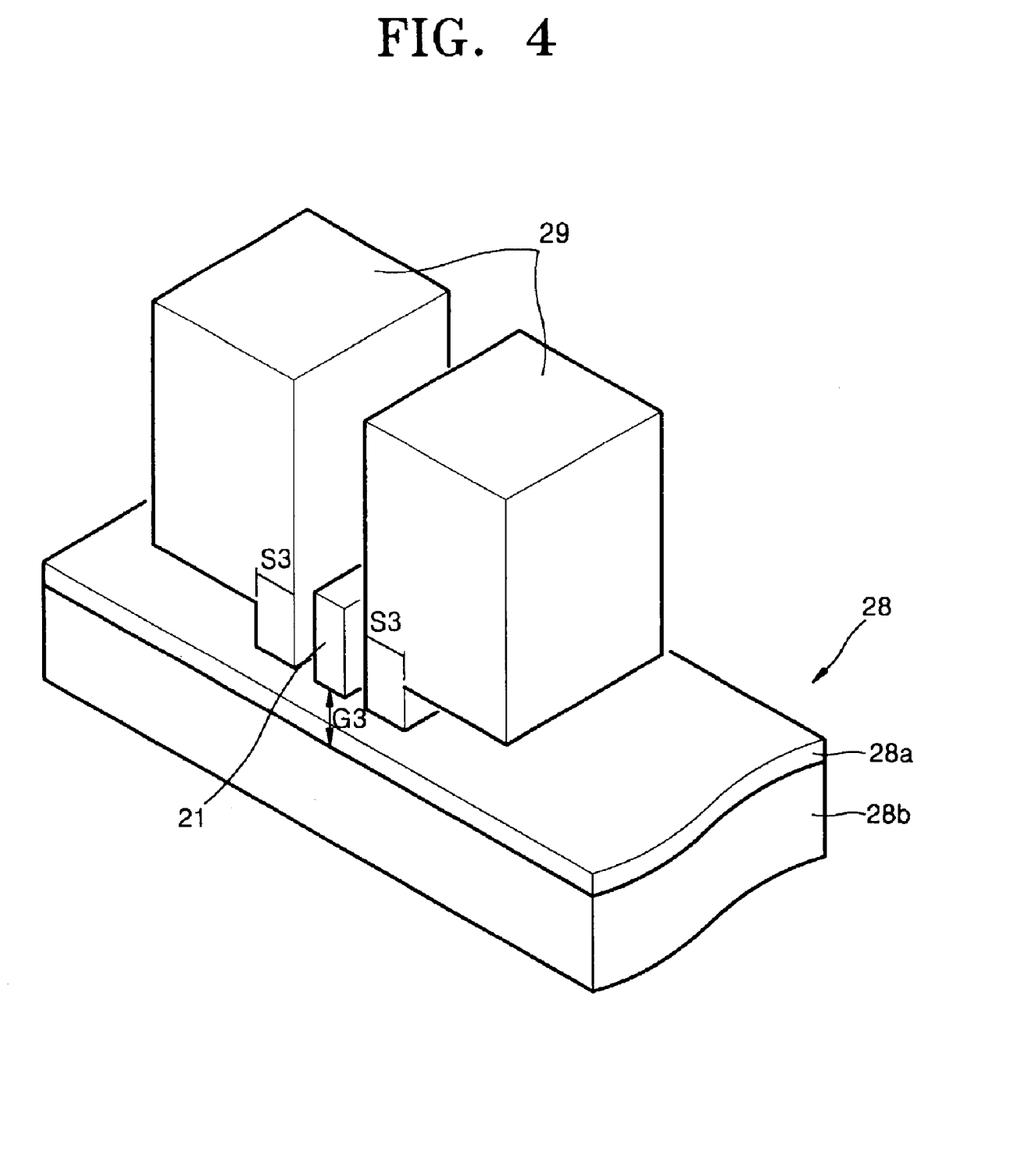
FIG. 4 is a perspective view of a magnetic reading head according to a third embodiment of the present invention.

FIG. 4 is a perspective view of a magnetic reading head according to a third embodiment of the present invention. Referring to FIG. 4, in the magnetic reading head according to the third embodiment, in order to obtain the same effects as those of the magnetic reading head according to the second embodiment, upper portions of shield layers 29 are wider than lower portions of the shield layers 29 and widths S3 of the lower portions are less than double a predetermined distance G3 between a MR element 21 and a soft underlayer 28b like in the magnetic reading head according to the second embodiment, preferably 0.1 $\mu$m or less.

Also, the lower portions of the shield layers 29 have steps so that the upper portions of the shield layers 29 have wider widths than the lower portions. Thus, magnetic field lines formed by the magnetization of a recording medium 28 under the shield layers 29 form magnetic paths so that the shield layers 29 face opposite directions to the MR element 21. As a result, noise affecting the MR element 21 can be reduced.

Here, heights of the steps are similar to the predetermined distance G3 between the MR element 21 and the soft underlayer 28b.

Figure 5:
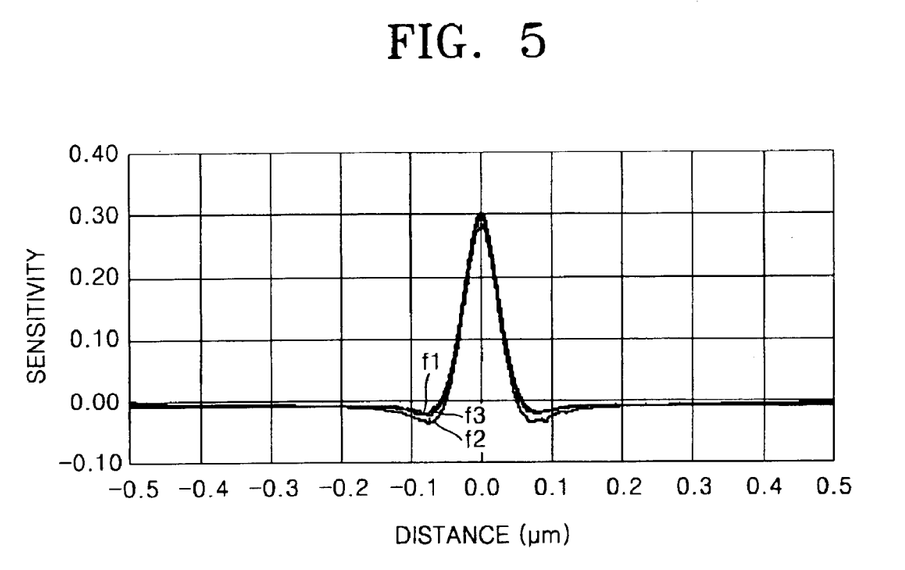
FIG. 5 is a graph illustrating the sensitivity of the conventional magnetic head and sensitivities of the magnetic reading heads according to the first and second embodiments of the present invention.

FIG. 5 is a graph illustrating changes in sensitivities of MR elements according to distances between the centers of the conventional magnetic reading head and the magnetic reading heads according to the first and second embodiments of the present invention.

Here, in the magnetic reading head according to the second embodiment, distances between the first shield layers 25 and the second shield layers 27 are set to 0.3 μm. In FIG. 5, f1 is a line graph showing changes in sensitivity according to distances on the right or left sides of the MR element of the conventional magnetic reading head, and f2 and f3 are line graphs showing changes in sensitivities according to distances on the right or left sides of the MR elements of the magnetic reading heads according to the first and second embodiments of the present invention.

Since the distance between the MR element and the shield layers is about 0.1 μm, the sensitivity is the highest in the center where the MR element is positioned, reduces to distances of 0.1 μm on the right and left sides of the MR element, and is close to zero for the distances under 0.1 μm.

Figure 6:
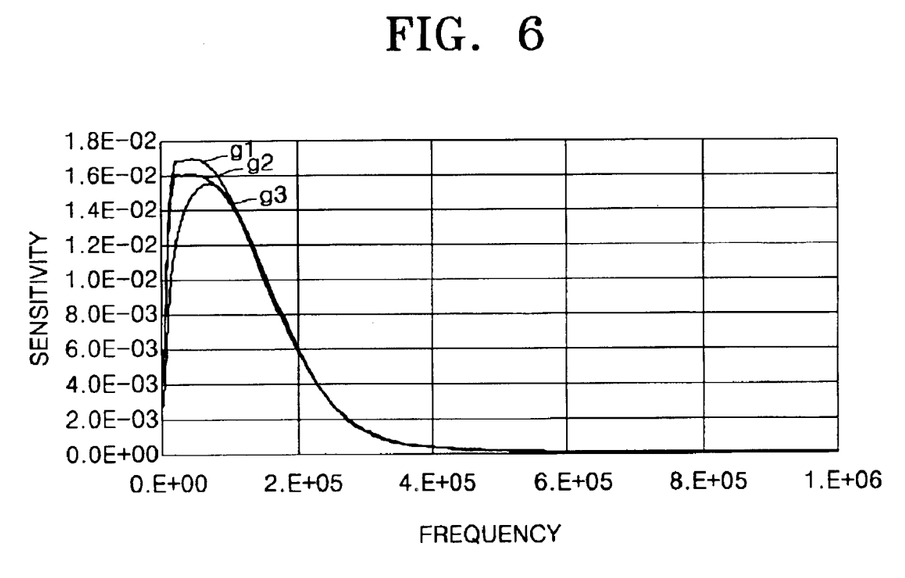
FIG. 6 is a graph illustrating the sensitivity of the conventional magnetic reading head and sensitivities of the magnetic reading heads according to the first and second embodiments of the present invention.

The graph shown in FIG. 6 is obtained by taking Fourier transform of the sensitivity graph of FIG. 5.

FIG. 6 is a graph showing improvements in sensitivities of the conventional magnetic reading head and the magnetic reading head according to the first and second embodiments of the present invention, according to frequency characteristics. Referring to FIG. 6, g1 is a line graph showing sensitivity of the conventional magnetic reading head versus frequency, g2 is a line graph showing sensitivity of the magnetic reading head according to the first embodiment versus frequency, and g3 is a line graph showing sensitivity of the magnetic reading head according to the second embodiment versus frequency.

If the frequency is smaller than $2\times10^{-5}(1/s)$, a generated signal is noise. Thus, as sensitivity with respect to a frequency band is low, the magnetic reading head is highly efficient.

As shown in FIG. 6, when the frequency is smaller than $2\times10^{-5}(1/s)$, the sensitivity is higher for the ling graph g1 and lower for g2 and g3. Thus, it can be seen that the magnetic reading heads according to the first and second embodiments of the present invention are highly efficient.

As described above, according to the present invention, widths of lower portions of shield layers of a magnetic reading head facing a recording medium can be set to be less than predetermined values, so that magnetic fields formed by the magnetization of the recording medium positioned beyond the range of the shield layers do not affect a MR element. As a result, sensitivity of the magnetic reading head can be improved.

While many contents have been described above, they must be interpreted as preferred embodiments, rather than as being restricted to the scope of the present invention.

For example, the structure of the magnetic reading head can be modified by those of ordinary skill in the art without departing from the spirit and scope of the present invention. Therefore, the scope of the present invention is defined by the appended claims and equivalents thereof.

What is claimed is:

1. A magnetic reading head which reads information recorded on a recording medium having a soft underlayer and a magnetic layer stacked on the soft underlayer, the magnetic reading head comprising:

a magneto-resistive element which is positioned over the magnetic layer, keeping a first predetermined distance from the soft underlayer; and a pair of shield layers which are arranged parallel to the magneto-resistive element, spaced from both sides of the magneto-resistive element by a second predetermined distance selected such that magnetic fields formed by magnetization of magnetic domains beyond the shield layers do not affect the magneto-restrictive element, wherein the shield layers have widths less than double of the first predetermined distance.

2. The magnetic reading head of claim 1, wherein the shield layers have widths of 0.1 μm or less.

3. The magnetic reading head of claim 1, wherein information is recorded on the magnetic layer using a perpendicular magnetic recording method.

4. A magnetic reading head which reads information recorded on a recording medium having a soft underlayer and a magnetic layer stacked on the soft underlayer, the magnetic reading head comprising:

a magneto-resistive element which is positioned over the magnetic layer, keeping a first predetermined distance from the soft underlayer;

a pair of first shield layers which are arranged parallel to the magnetoresitive element, spaced from both sides of the magneto-resistive element by a second predetermined distance selected such that magnetic fields formed by magnetization of magnetic domains beyond the shield layers do not affect the magneto-restrictive element; and a pair of second shield layers which are arranged parallel to the pair of first shield layers, keeping predetermined distances from the first shield layers, wherein the first shield layers have widths less than double of the first predetermined distance.

5. The magnetic reading head of claim 4, wherein the first shield layers have widths of 0.1 μm or less.

6. The magnetic reading head of claim 4, wherein information is recorded on the magnetic layer using a perpendicular magnetic recording method.

7. A magnetic reading head which reads information recorded on a recording medium having a soft underlayer and a magnetic layer stacked on the soft underlayer, the magnetic reading head comprising:

a magneto-resistive element which is positioned over the magnetic layer, keeping a first predetermined distance from the soft underlayer; and a pair of shield layers which are arranged parallel to the magnetoresitive element, spaced from both sides of the magneto-resistive element by a second predetermined distance selected such that magnetic fields formed by magnetization of magnetic domains beyond the shield layers do not affect the magneto-restrictive element, wherein the shield layers have upper and lower portions, bottom surfaces of the lower portions of the shield layers face the recording medium, the upper portions of the shield layers are wider than the lower portions of the shield layers, and the bottom surfaces of the lower portions have widths less than double of the first predetermined distance.

8. The magnetic reading head of claim 7, wherein the bottom surfaces of the lower portions of the shield layers facing the recording medium have widths of 0.1 μm or less.

9. The magnetic reading head of claim 7, wherein information is recorded on the magnetic layer using a perpendicular magnetic recording method.

* * * * *